United States Patent [19]

Benedict et al.

[11] Patent Number: 5,321,812

[45] Date of Patent: Jun. 14, 1994

[54] LOOP DETECTION AND DISSOLUTION IN A FOCAL POINT NETWORK

[75] Inventors: Sandra L. Benedict, Cary; Jeffery L. Crume; Steven M. Golberg, both of Raleigh; Robert L. Nielsen, Durham, all of N.C.

[73] Assignee: International Business Machines Corp., Armonk, N.Y.

[21] Appl. No.: 692,757

[22] Filed: Apr. 29, 1991

[51] Int. Cl.⁵ .................. G06F 13/14; G06F 7/04
[52] U.S. Cl. .................. 395/200; 364/222.2; 364/242.94; 364/266; 370/16
[58] Field of Search .................. 395/200; 370/16, 94.1, 370/54; 340/825.2, 825.3, 825.5, 825.6; 379/221; 364/222.2, 242.94, 266

[56] References Cited

U.S. PATENT DOCUMENTS

| | | | |
|---|---|---|---|
| 4,736,363 | 4/1988 | Aubin et al. | 370/60 |
| 4,748,658 | 5/1988 | Gopal et al. | 379/221 |
| 4,825,206 | 4/1989 | Brice, Jr. et al. | 340/825.02 |
| 4,995,035 | 2/1991 | Cole et al. | 370/95.2 |
| 5,014,262 | 5/1991 | Harshavardhana | 370/16 |
| 5,049,873 | 9/1991 | Robins et al. | 379/14 X |

OTHER PUBLICATIONS

LaRoy W. Tymes, "Routing and Flow Control in TYMNET" IEEE Trans. on Communications, vol. COM-29, No. 4, Apr. 1981, pp. 392-398.

McQuillan et al., "The New Routing Algorithm for the ARPANET" IEEE Trans. on Communications, vol. COM-28, No. 5, May 1980, pp. 711-719.

Primary Examiner—Gareth D. Shaw
Assistant Examiner—Dennis M. Butler
Attorney, Agent, or Firm—Gerald R. Woods

[57] ABSTRACT

In a focal point network, adjacent nodes may agree to a relationship where one node (a focal point or server node) supplies network management services to the other node (a non-focal point or served node). A served node forwards management services data to its server node without waiting for any request. There is a risk that the nodes will become configured into a closed loop within which data, once introduced, will circulate endlessly. To eliminate this risk, a loop-detection message is generated when a node acquires a new server node and is itself a server node for other nodes. The message, which includes the originating node's name, is passed from served node to server node. Each node inspects the message. If it does not find its own name, it appends its name to the message and passes it on to its own server node. If the node does find its own name, it generates a loop-detected message that revokes the server/served relationship with the current server node.

8 Claims, 5 Drawing Sheets

FIG. 8

LOOP DETECTION AND DISSOLUTION IN A FOCAL POINT NETWORK

FIELD OF THE INVENTION

The present invention relates to computer networks and more particularly to a method and system for detecting and eliminating closed loops which might otherwise be formed in a focal point network.

BACKGROUND OF THE INVENTION

The importance of computer networks in day-to-day business operations has become a fact of life for many enterprises. The ability of an enterprise to effectively manage the resources of a computer network becomes increasingly important to the enterprise as its use of the network intensifies and as the network itself becomes larger and more complex.

The need for effective network management is most apparent for a large network consisting of individual computer systems or nodes interconnected through communication links. The topology or configuration of such a network typically changes constantly as nodes and/or links are added or dropped.

Because the network itself changes dynamically, a network manager should be capable of responding dynamically to changes in the network when providing management services. A suitable type of network manager is shown in U.S. Pat. No. 4,995,035, issued Feb. 19, 1991, and assigned to the assignee of the present invention.

According to the teachings of this patent, nodes in a computer network are classified either as: (1) control nodes, called focal point (FP) or server nodes; or (2) managed nodes, called non-focal point (NFP) or served nodes. Focal point or server nodes are nodes capable of providing management services to other nodes in the network. One example of such management services is the reception and handling of Alerts, which are messages indicating an event (typically an error event) occurring somewhere in the network. A network which implements the focal point/non-focal point concept is sometimes referred to as a focal point network even though every node in the network is not necessarily a focal point.

A server/served relationship may be established at the request of either of the two potentially-paired nodes. For example, node A may offer to provide a particular management service to node B. If node B accepts the offer, the server/served relationship is established for the particular management service covered by the offer. Alternatively, node B may ask node A to provide a particular management service. If node A accepts, the same server/served relationship is established.

The server/served relationship can also be described as a nested/nesting relationship. Any node which receives a management service from another node is referred to as a nested node with respect to that service. The node that provides the service is referred to as the nesting node.

For any given service, the same node may act both as a server node and as a served node relative to the different nodes with which it is paired. Thus, a given node A may provide Alerts services to a second node B while concurrently receiving Alerts services from a third node C. In fact an entire chain of nodes can exist where all of the intermediate nodes provide a management service to the next node in the chain while receiving the same service from the previous node in the chain.

Once a server/served relationship is established between two nodes, management service data originating at a served node is forwarded on an unsolicited basis to its server node. If a node which receives such data from an originating node is itself also a served node relative to a different server node, it will also forward the management service data to its own server node. Management service data can propagate along an entire chain of nodes.

Allowing two nodes to decide independently of any other nodes whether one will provide management services to the other provides considerable flexibility in determining by whom and to whom necessary management services will be made available. Unfortunately, it can also lead to problems.

If a node at one end of a chain of nodes contacts or is contacted by the node at the opposite end of the chain, a server/served relationship may be set up between those two nodes without regard to the fact the nodes are at the opposite ends of a chain. If that happens and each of the other nodes in the chain has a particular relationship relative to the other two nodes with which it is paired, a closed or continuous loop will be formed.

Management service data originating at any node in the loop will will automatically be passed around the loop from each served node to its server node. Since there is no "end" to the loop, the same data will eventually return to the originating node and thereafter continue to flow around the loop. It goes without saying that continuous circulation of old data through multiple nodes in a computer network isn't viewed as a productive use of the network's resources.

SUMMARY OF THE INVENTION

The present invention is a system and method for detecting loops in focal point networks and for dissolving those loops to prevent endless transfers of management services data.

According to the invention, a loop-detection method is practiced in a network having both focal point or server nodes and non-focal point or served nodes. The method is performed in at least one node in the network, referred to as the given node. The given node responds to the establishment of another node as a new server node by creating a loop-detection message that includes the given node's name. The created loop-detection message is forwarded to the new server node. The same given node also receives loop-detection messages provided by other nodes for whom the given node is a server node. Received loop-detection messages are examined to determine whether such messages contain the given node's name. If the given node does not find its own name in the message, it alters the message to include its name and passes the message on to its own server node. If the given node does find its own name in the message, which can only occur if the message originated at the given node and has propagated around a closed loop back to the given node, then the given node generates a loop-detected message that is passed on to its own server node. The loop-detected message operates to dissolve or revoke the server/served relationship between the new server node and the given node, thereby opening the loop.

DESCRIPTION OF THE DRAWINGS

While the specification concludes with claims particularly pointing out and distinctly claiming that which is regarded as the present invention, further details of a preferred embodiment of the invention may be more readily ascertained from the following detailed description when read in conjunction with the accompanying drawings wherein:

DETAILED DESCRIPTION

Figure 1:
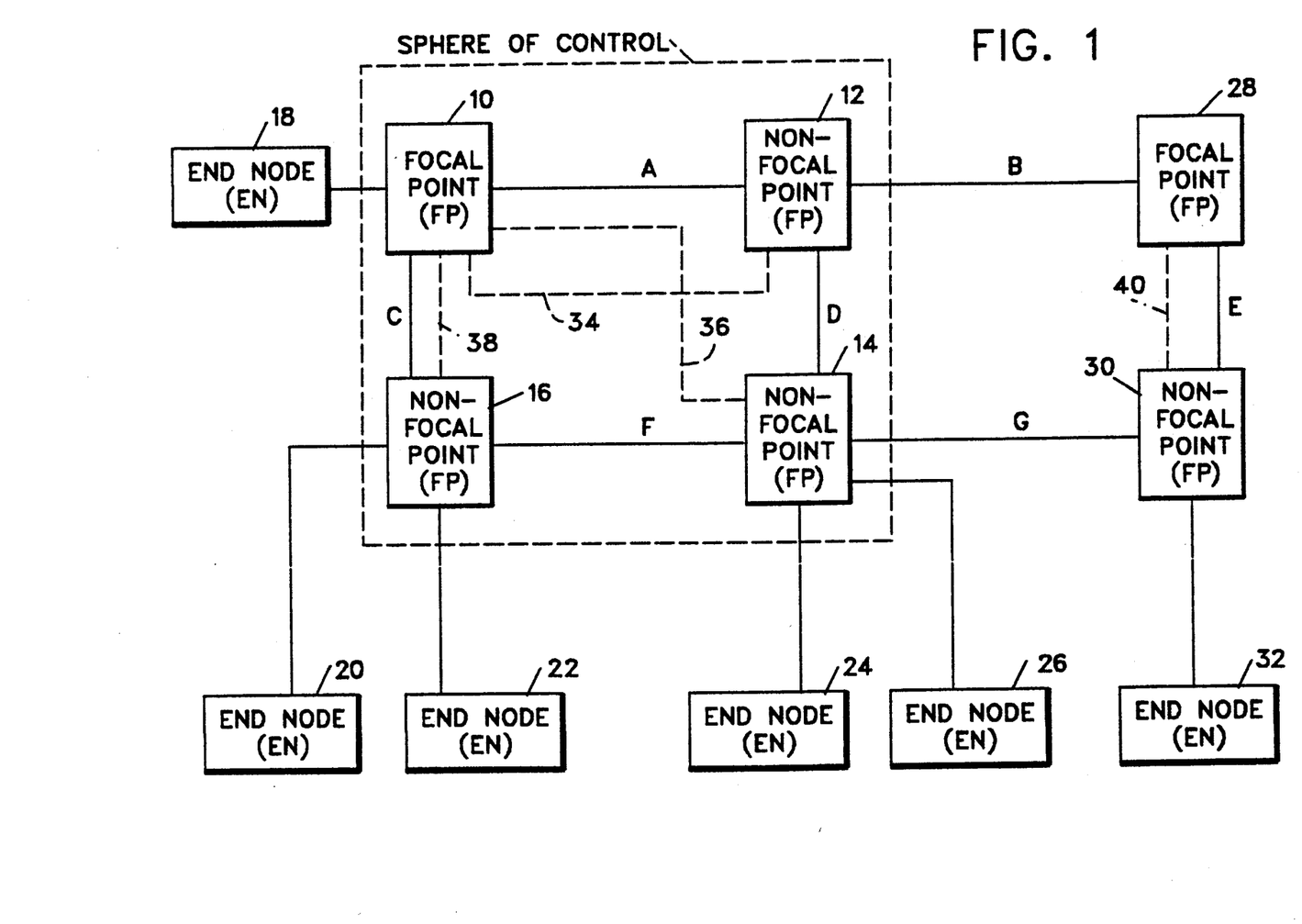
FIG. 1 is schematic of a network including both focal point (server) and non-focal point (served) nodes.

FIG. 1 is a block diagram of a computer network which implements the focal point architecture referred to briefly above and within which the present invention may be practiced. The network is shown as having a plurality of network nodes 10, 12, 14, 16, 28 and 30. Network nodes normally include host processors controlled by an operating system program and running various application programs, including communications programs used in communicating with other nodes. The network nodes are interconnected by communications links A, B, C, D, E, F and G.

The network also includes a plurality of end nodes 18, 20, 22, 24, 26, and 32, each of which is connected to one of the network nodes. End nodes may include devices such as intelligent terminals, printers or small computers. End nodes differ from network nodes in that end nodes do not provide certain network services provided by network nodes.

During network operation, the network nodes may take on the roles of focal point or non-focal points. FIG. 1 arbitrarily shows nodes 10 and 28 as focal point nodes and nodes 12, 14, 16 and 30 as non-focal point nodes. A focal point node is a network node that is currently providing at least one network management service to another node in the network. In the Figure, node 10 is shown acting as a focal point for management services being provided to non-focal point nodes 12, 14 and 16. The functional links by which node 10, which may be considered a server node, provides management services to nodes 12, 14 and 16, which may be considered served nodes, are represented by dashed lines 34, 36 and 38, respectively.

Any non-focal point node receiving at least one management service from a focal point node at a given time is referred to as being within the sphere of control of the focal point. For example, in the network shown in FIG. 1, non-focal point nodes 12, 14 and 16 are shown within the sphere of control of focal point node 10.

To understand the focal point concept clearly, several points must be remembered. First, the same network node may concurrently be both (1) a focal point to any node to which it is providing a management service and (2) a non-focal point node to any node from which it is receiving a management service. Second, the status of a node (focal point v. non-focal point) can change dynamically during network operations. As noted earlier, either of two potentially-paired nodes may request the establishment of a focal point/non-focal point (or server/served) relationship.

Third, any server/served relationship is limited to a particular type of management service; e.g., the handling of Alerts. Different sets of server/served relationships may exist concurrently between the same nodes for different types of management services.

Given these points, it becomes clear that FIG. 1 is basically a "snapshot" of the way in which a network provides a particular management service at a given time. For a different management service being provided at the same time, the "snapshot" might look entirely different. For the same management service but at a different time, the "snapshot" might also look entirely different.

Figure 2:
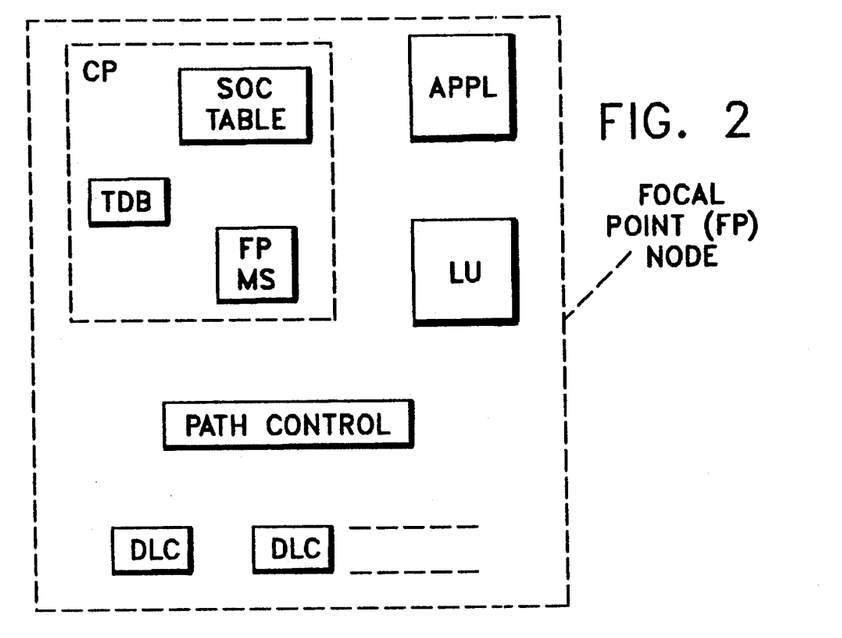
FIG. 2 is a schematic representation of functional components included in a node acting as a focal point node.

FIG. 2 is a schematic representation of the major components of a node performing a focal point function. Many of the major components exist in any node which implements a known APPN architecture. Details of the components are not required to understand how to make and use the present invention. A reader still interested in component details may find them in:

1. "Advanced Program to Program Communication and Advanced Peer-to-Peer Networking User's Guide", a manual available from the assignee of the present invention as publication SC21-9598, and
2. "Advanced Peer-to-Peer Networking (APPN) for AS/400 System, available from the assignee of the present invention as publication GC24-3287.

The following description is of functional components. In reading the description, it should be kept in mind that the functions are actually performed by hardware or, more likely, by programs being executed in combination with hardware.

A focal point node includes a control point or CP, one or more application programs (APPL), a logical unit (LU), path control, an SOC (Sphere of Control) table, a topology database (TDB), and a plurality of data link control (DLC) modules.

Each DLC module provides a protocol conversion function which allows any message leaving the focal point node to be converted to a format which complies with the requirements of one of the communications links. Having multiple DLC modules just allows messages to be converted to different formats. The path control module provides routing functions needed to transfer a message from a source to a destination node.

The CP or control point provides control functions for the node, such as establishing sessions, calculating routes, providing directory services, etc. In providing certain services, the CP may use the node's topology database (TDB) which defines the nodes in the network and the communications links which connect those nodes. Finally, the logical unit or LU provides an interface between a user (including an application program) and the remainder of the network.

The components or modules described immediate above are basically the same as corresponding modules in any APPN node. To implement the focal point concept, the SOC tables and a focal point management services program are added to the node. A different SOC table may exist for each different management service that a node may provide to other node. Each SOC table contains a list of all network nodes for which the local node may be responsible. The list also contains an indicator of the current status of the relationship between the local node and each of the other nodes in the list. At a given point in time, the relationship may be active or inactive for a number of reasons. Further details about the SOC table may be found in U.S. Pat. No. 4,995,035, referenced earlier.

A focal point management services (FPMS) program controls the focal point functions of the node. The FPMS program controls the type of focal point node role being assumed by the local node and the types of network management services being provided by the node. As pointed out in the referenced patent, a node may be a primary focal point, a secondary focal point or a back-up focal point. The differences between the types of focal points are elaborated on in the patent.

Figure 3:
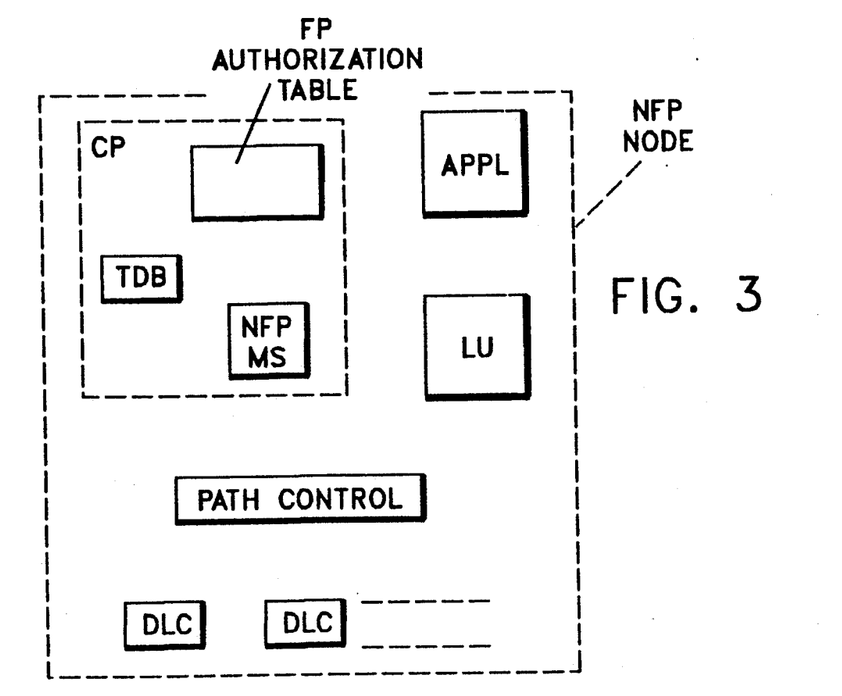
FIG. 3 is a schematic representation of functional components included in a node acting as a non-focal point node.

A node acting as a non-focal point or served node has the same APPN components as a focal point node. A non-focal point node additionally contains an FP authorization table and a non-focal point management services (NFP MS) program. The additions allow a non-focal point node to respond to a focal point node and to exchange messages which cause the non-focal point node to transmit management services information to the focal point node. The FP authorization table lists focal point names, management services (MS) keys or identifiers, and focal point types. The NFP MS program controls the node as it performs non-focal point functions.

The process by which focal point/non-focal point (or server/served) relationships are established is described in detail in the referenced patent. For purposes of this description, it is important to note that the relationship is established by two linked nodes without regard to existing management services relationships that either node may have with other nodes.

Since any FP/NFP (or server/served) relationship is independently established, the same node in a network may provide a management service to one node while receiving the same management service from another node. It is therefore, possible for several nodes to form an open-ended chain in which each node provides a particular management service to the next node in the chain while receiving the same management service from the preceding node.

Figure 4:
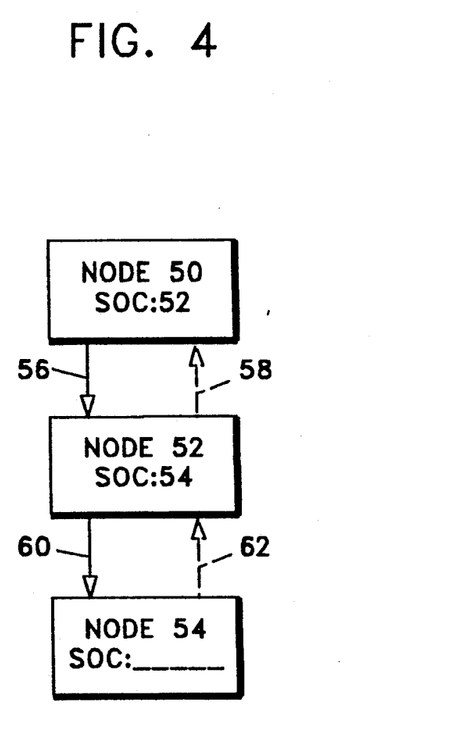
FIG. 4 is a block diagram of several nodes in an open-ended chain.

FIG. 4 illustrates such a chain. A simple system, consisting of three nodes, 50, 52 and 54 is assumed. In this system, node 50 has assumed the role of focal point for node 52 for a specific management service. The SOC table for node 50 lists node 52 as a non-focal point or served node. Focal point control is indicated by solid arrow 56 while dashed arrow 58 indicates the direction in which management services data can flow on an unsolicited basis.

Node 52 has a dual role. It is both a served node with respect to node 50 and a server node with respect to node 54. The focal point status of node 52 is shown by solid arrow 60 while dashed arrow 62 indicates the direction of management services data flow. Node 54, on the other hand, acts only as a non-focal point or served node, as indicated by the absence of any entry in its SOC table.

There is nothing wrong with an open-ended chain of the type shown in FIG. 4. Management service data passes along the chain from the point of orgin to the head of the chain. For example, management service data originating in node 54 flows through node 52. The flow ends at node 50.

Figure 5:
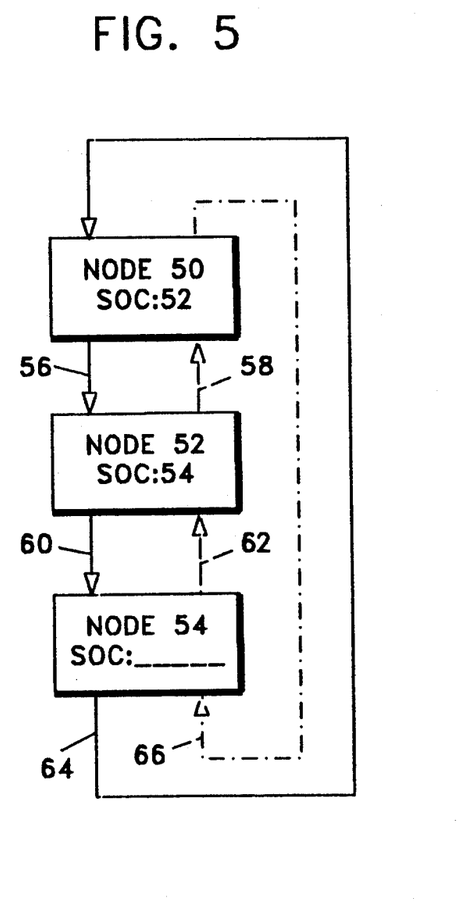
FIG. 5 is a block diagram of the same nodes shown in the prior Figure in a undesired closed chain or loop.

A problem arises where nodes 50 and 54 set up a server/served relationship between themselves, which can happen as such relationships are established independently of existing relationships involving other nodes. Referring to FIG. 5, if the nodes 50 and 54 agree that node 54 will supply management services to node 50, as indicated by solid arrow 64, then a circular or closed loop relationship is established among the nodes. Management service data passing automatically from served node to server node will repeatedly flow around the loop in the direction indicated by dashed arrows 58, 62 and 66, continuously consuming network resources unless steps are taken to detect and dissolve the loop.

Figure 6:
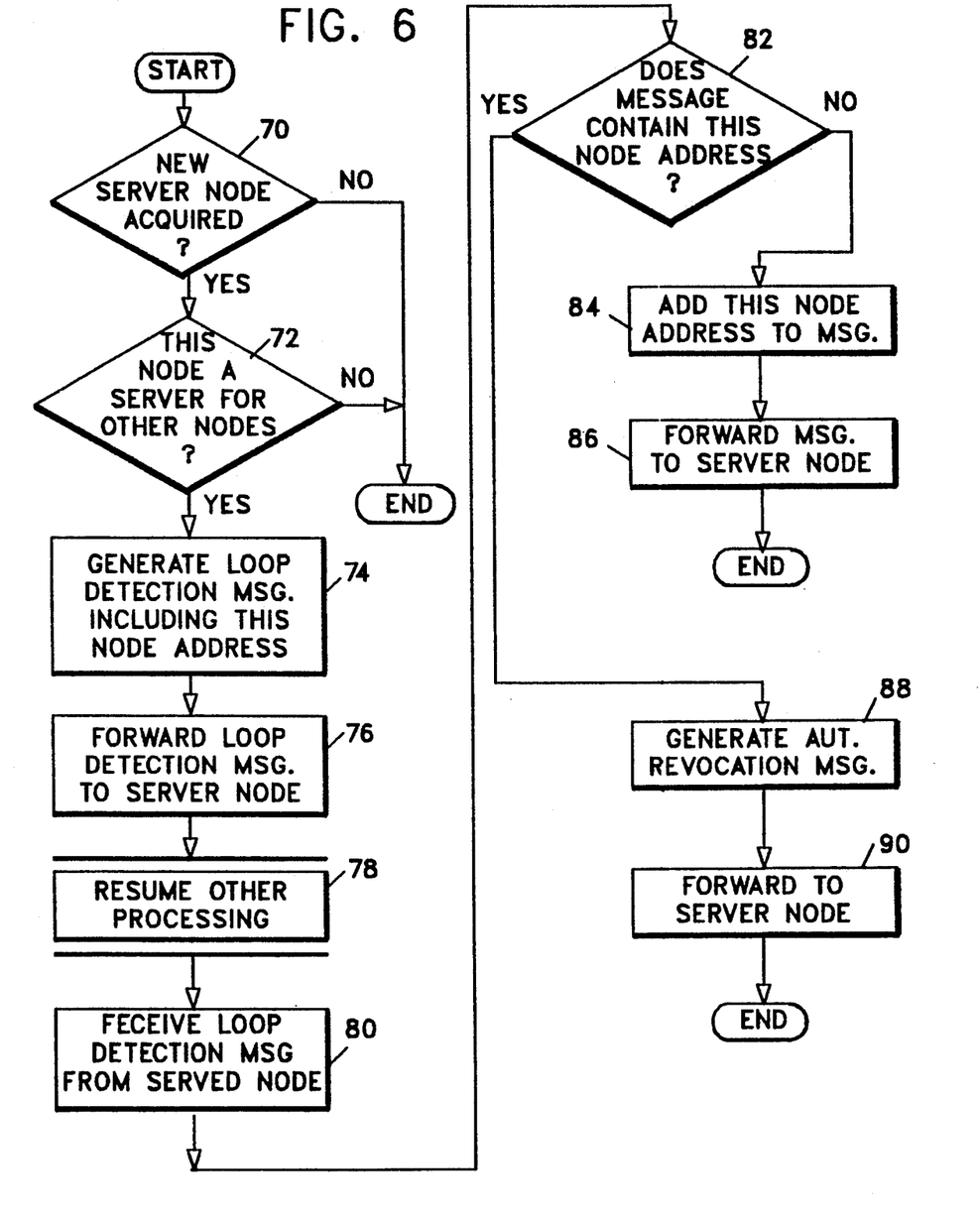
FIG. 6 is a flow chart of the loop detection and dissolution process implementing the present invention.

FIG. 6 is a flow chart of a process which can be practiced at one or more nodes in a focal point network to detect loops of the type shown in FIG. 5 and to dissolve or open up such loops. The process is initiated only when an operation 70 indicates the local node (the node at which the process is performed) has acquired a new focal point or server node. When that happens, a check 72 is made to see whether the local node is simultaneously acting as a focal point for other nodes in the network.

If the local node is not itself a focal point for other nodes, a closed loop cannot exist and the loop detection process is ended. If, however, the local node is also a focal point, a loop detection message is generated at the local node in an operation 74. Details of a preferred form of the message are provided later. For now, it is only important to know that the local node's name is incorporated into the message. The loop detection message is forwarded to the server node in an operation 76 and the local node returns to an operating mode 78 in which other operations unrelated to loop detection are performed.

The term "name" is used generically in the preceeding paragraph and elsewhere to indicate an network's identifier for a particular node. The exact form of any node name will be a function of the addressing conventions employed by a system in which the present invention is practiced.

A second phase of the process is triggered if a loop detection message is received from a served node in an operation 80. The loop detection message is broken down or parsed in an operation 82 to determine whether it contains the name of the local node. If the local node name is not found, that means the message originated elsewhere and is not one that has returned to the local node through a closed loop. The local node's name is appended to the message in an operation 84 and the modified message is forwarded to the server node for the local node.

If operation 82 reveals, on the other hand, that the loop detection message does contain the local node's name, that means the message has returned to the local node after traversing a closed loop. The local node, in an operation 88, generates a loop-detected or authorization-revoked message. The generated message is forwarded to the server node 90. Node 90 interprets the message as a revocation of its authority to act as a focal point and the server/served relationship between the two nodes is dissolved or terminated. The dissolution of server/served relationship between the local node and its former server node breaks or opens the loop which allowed the message to return to the local node.

Figure 7:
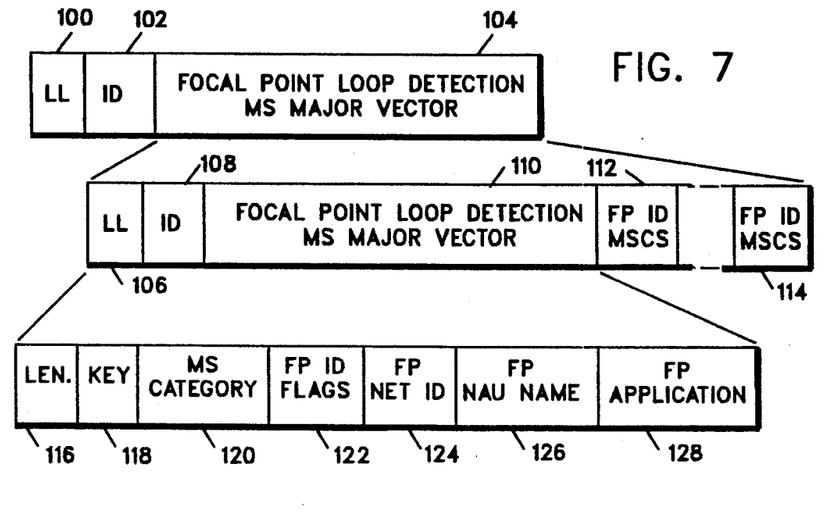
FIG. 7 is an exploded representation of a suitable loop-detection message for use in the present invention.

FIG. 7 shows a format for a suitable loop detection message. At the highest level, the message includes a length field 100 which defines the length of the message, an ID field 102 which identifies the message as a loop detection message and a major vector field 104 which is used to identify the nodes that have received and passed on this particular message.

Major vector field 104 can be broken down into a length field 106 which defines the length of the major vector field, an ID field 108 which identifies the major vector field and one or more common subvector fields, such as field 110, 112 and 114. The number of subvector fields will be a function of the number of nodes that have seen the message. A node that intends to pass on the message first alters the message by appending its own name in the form of an additional common subvector field. Thus, in the example shown, the node identified by field 114 would be the last node to have seen the message.

Each common subvector field can be broken down into subfields which precisely identify each node that receives the loop detection message. The subfields in each common subvector field include a length subfield 116 identifying the length of the common subvector field, a key field 118 identifying the function of the field, a Management Services subfield 120 identifying the particular type of management service involved, a flags subfield 122 defining characteristics of the identified node, and NETID, NAU NAME and APPLICATION subfields 124, 126 and 128 which, taken together, provide a complete identifier for the local node and the application program which generated the loop detection message.

Figure 8:
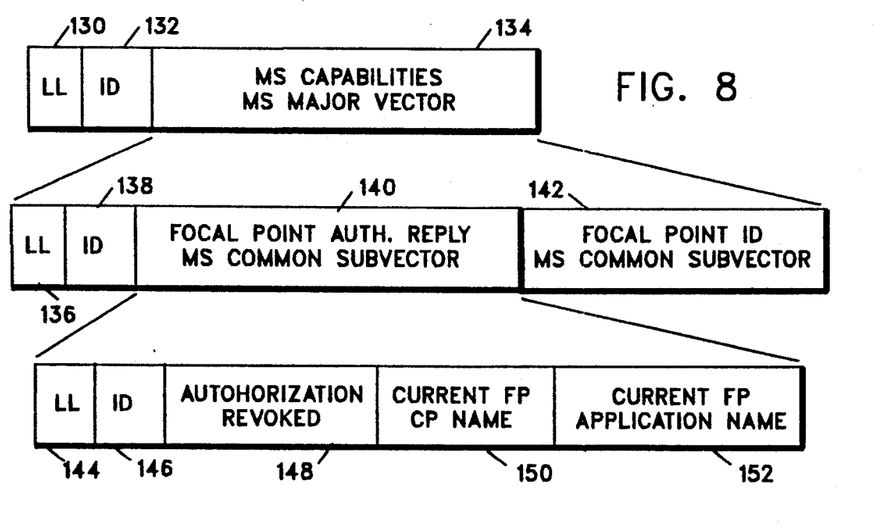
FIG. 8 is an exploded representation of a suitable loop-detected message for use in the present invention.

As noted earlier, the detection of a closed loop by a local node will result in generation of a loop-detected message that is passed on to the local nodes server node. FIG. 8 represents a preferred form of that message. At the highest level, the loop-detected message includes a length field 130, an ID field 132 and a MS CAPABILITIES major vector field 134.

The major vector field 134 can be broken down into a length field applicable only to field 134, an ID field 138 which identifies the field 134 as containing an authorization message, an authorization reply field 140, and a focal point ID field 142 which identifies the node originating the message.

The authorization reply field 140 can, in turn be broken down into a length subfield 144, a key subfield 146 identifying the type of reply, an authorization-revoked field 148 and two fields 150 and 152 that together identify the application that had been providing the revoked management services.

While there has been described what is considered to be a preferred embodiment of the present invention, variations and modifications in that embodiment may occur to those skilled in the art once they are made aware of the basic concepts of the invention. Therefore, it is intended that the appended claims shall be construed to include both the preferred embodiment and all such variations and modifications as fall within the true spirit and scope of the invention.

What is claimed is:

1. For use in computer network including a plurality of interconnected nodes wherein at least some of said nodes are server nodes capable of providing network management services to other nodes called served nodes, wherein a relationship between a server node and a served node may be established at the request of either node and wherein a node may concurrently act as a server node for other served nodes and as a served node of another server node, loop-detection means at a given node for detecting a closed loop among nodes which have requested server/served relationships with adjacent nodes, said loop-detection means comprising:

means for producing a predetermined indicator when the given node is to be served by a new server node;

means responsive to the existence of the predetermined indicator for creating a loop-detection message including the name of the given node;

means for forwarding the created loop-detection message to said new server node;

means for receiving loop-detection messages provided by other nodes for whom the given node is itself a server node;

means for examining each received loop-detection message for names of nodes; and means responsive to the presence of the given node name in a received loop-detection message to generate a loop-detected message and to the absence of the given node's name in a received loop-detection message to alter the message to include the given node name and to forward the altered message to said new server node.

2. A loop-detection means as defined in claim 1 further including means resonsive to the first-named means for determining whether the given node is itself a server node for other nodes in the network and wherein said message creating means becomes operable only if the given node is a server node.

3. Loop-detection means as defined in claim 2 further including means for forwarding the loop-detected message to the server node for the given node in order to revoke the server/served relationship, thereby opening the loop.

4. Loop-detection means as defined in either of claims 2 or 3 wherein the loop-detection message is altered by the means responsive to the presence of the given node name by appending the given node's name to the message.

5. For use in a computer network including a plurality of interconnected nodes wherein at least some of said nodes are server nodes capable of providing network management services to other nodes called served nodes, wherein a relationship between a server node and a served node may be established at the request of either node and wherein a node may concurrently act as a server node for other served nodes and as a served node of another server node, a method of detecting a closed loop among nodes that have requested server/served relationships with adjacent nodes, said method being practiced at a given node and comprising the steps of:

detecting the existence of a new server-served relationship in which the given node receives services from a given server node;

responding to detection of the new server-served relationship by creating a loop-detection message including the given node's name;

forwarding the created loop-detection message to the given server node;

receiving loop-detection messages from other nodes for whom the given node is a server node;

responding to the presence of the given node's name in a received loop-detection message to generate a loop-detected message; and responding to the absence of the given node's name in a received loop-detection message to add the given node name to the message and to forward the loop-detection message to a server node for the given node.

6. A method as defined in claim 5 including the further step of responding to a loop-detected message received from a served node to revoke the server/served relationship, thereby opening a closed loop.

7. For use in a computer network including a plurality of interconnected nodes wherein at least some of said nodes are server nodes capable of providing network management services to other nodes called served nodes, wherein a relationship between a server node and a served node may be established at the request of either node and wherein a node may concurrently act as a server node for other served nodes and as a served node of another server node, a system for revoking an authorized server/served relationship that would result in a closed loop of nodes having such relationships, said system existing at a given node served by a server node and comprising:

first means for generating loop-detection messages and for forwarding said generated loop-detection messages to adjacent server nodes;

second means for examining received loop-detection messages for the presence of the given node's own name in a received loop-detection message; and third means responsive to the presence of the given node's own name in a received loop-detection message to revoke a server-served relationship between the given node and its server node.

8. A system as defined in claim 7 wherein said third means operates only to revoke a server/served relationship for a particular service defined in the received loop detection message.

* * * * *